United States Patent

Walter

[15] 3,662,456

[45] May 16, 1972

[54] FLEXIBLE CIRCUIT ALIGNING FIXTURE

[72] Inventor: Allan F. Walter, Exton, Pa.

[73] Assignee: Burroughs Corporation, Detroit, Mich.

[22] Filed: May 27, 1970

[21] Appl. No.: 40,821

[52] U.S. Cl.........................29/203 J, 29/203 P, 29/203 MM
[51] Int. Cl.......................................H05k 13/04, H05k 3/32
[58] Field of Search.........29/203 R, 203 MM, 203 MW, 452, 29/203 D, 203 J, 203 P

[56] References Cited

UNITED STATES PATENTS 3,174,214 3/1965 Davis..............................29/203 MM
3,257,712 6/1966 Tegethoff........................29/203 MM

*Primary Examiner*—Thomas H. Eager
*Attorney*—Edward J. Feeney, Jr., Paul W. Fish and Charles S. Hall

[57] ABSTRACT

A fixture for aligning elongate flexible tapes containing electrical conductors. The tapes are accurately adjusted longitudinally and transversely, and are arranged in a lattice which later is to become part of a thin film magnetic memory apparatus. The tapes are held securely in the lattice so that undesirable shifting of the tapes is eliminated or substantially reduced.

10 Claims, 5 Drawing Figures

INVENTOR.
ALLAN F. WALTER
BY Samuel Kane
ATTORNEY

INVENTOR.
ALLAN F. WALTER
BY Samuel Kane
ATTORNEY

INVENTOR.
ALLAN F. WALTER

BY Samuel Kane

ATTORNEY

FLEXIBLE CIRCUIT ALIGNING FIXTURE

BACKGROUND OF THE INVENTION

This invention relates generally to apparatus for fabricating flexible tape assemblies and particularly to an aligning fixture for constructing a lattice of flexible tapes for a thin film memory apparatus.

In one method of fabricating a thin film memory apparatus, flexible tapes which contained the word lines, bit lines and sense lines, and which were coated with an adhesive material, were arranged in the form of a lattice in a fixture and secured to the fixture, after being aligned, by means of adhesive tape. The fixture containing the aligned lattice was next placed into a furnace, and the lattice fused by softening the adhesive material by applying heat and pressure to the flexible tape intersections. This method was not always satisfactory, since in many cases the flexible tapes shifted from their aligned positions so that the subsequent placement of the thin films at the conductor intersections could not be made with accuracy.

SUMMARY OF THE INVENTION

Accordingly, one of the objects of the present invention is to provide an apparatus for accurately aligning flexible circuits in the process of fabricating an assembly.

Another object of the invention is to provide such an apparatus in which the flexible circuits will retain their aligned positions when subjected to heat and pressure.

A further object of the invention is to provide an apparatus for fabricating a lattice of flexible tapes containing flexible electrical conductors so that accurate placement of magnetic thin films at the conductor intersections in the process of fabricating a thin film memory apparatus can readily be accomplished.

Still another object of the invention is to provide an aligning fixture for flexible tapes which is simple to use and inexpensive to manufacture.

In accordance with the above objects and considered first in one of its broader aspects, an apparatus according to the invention for aligning an elongate flexible tape containing flat flexible electrical conductors may comprise a framework having opposite spaced mounting portions and first and second clamping means each supported on one of the mounting portions for securing an end portion of the tape. At least one of the clamping means is pivotally supported on a pivot. An adjusting means is provided for adjusting the opposite clamping means which is opposite to a pivoted clamping means so as to move the tape and the opposite clamping means in an arc about the pivot so as to bring the tape conductors into closer alignment with an aligning surface.

The invention will be more clearly understood when the following detailed description of the preferred embodiment thereof is read in conjunction with the accompanying drawing which is described below.

DESCRIPTION OF THE PREFERRED EMBODIMENT

Figure 2:
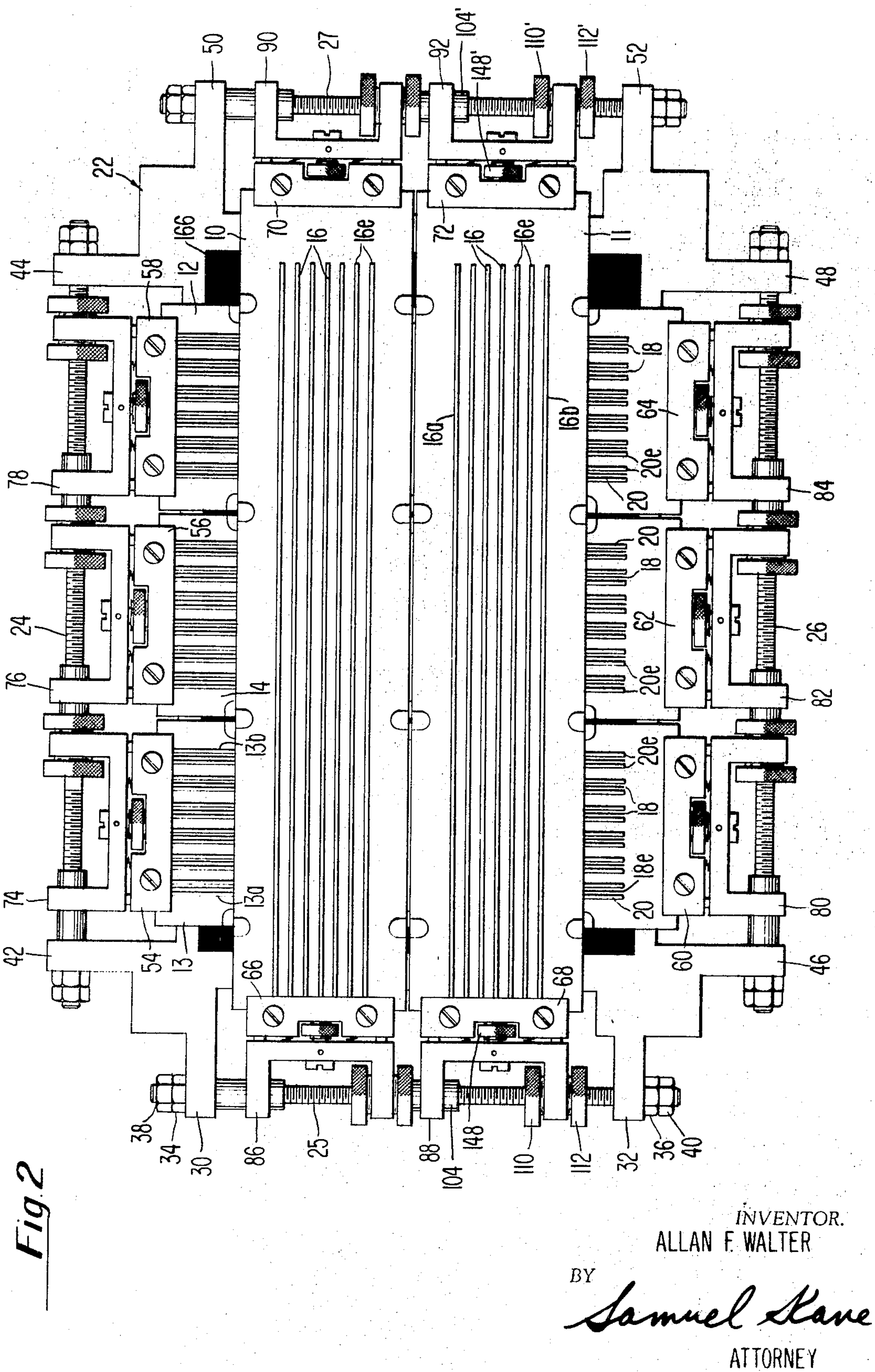
FIG. 2 is a view similar to FIG. 1 and includes a lattice of flexible tapes clamped to the fixture and in aligned position.

Turning now to FIG. 2 of the drawing, there is illustrated therein a lattice of flexible tapes 10–14 each constructed of an electrical insulating translucent material and carrying a group of electrical conductors on one of its surfaces. As will appear later on, the tape lattice will later be used in the fabrication of a thin film magnetic memory. Accordingly, tapes 10 and 11 carry word lines 16 and tapes 12, 13, and 14 carry sense lines 18 and split bit or information lines 20. Later in the fabricating process, glass substrates, not shown, but containing an array of thin films are combined with the tape lattice in a manner similar to that disclosed in U. S. Pat. No. 3,496,555 so that each thin film will be accurately positioned at the intersection of a word line 16 and sense and bit lines 18 and 20. By aligning the individual tapes of the lattice by means of the aligning fixture of the invention, the tapes will have the proper positional relationship with respect to each other so that accurate placement of the thin films at the conductor intersections later on will be assured.

Figure 1:
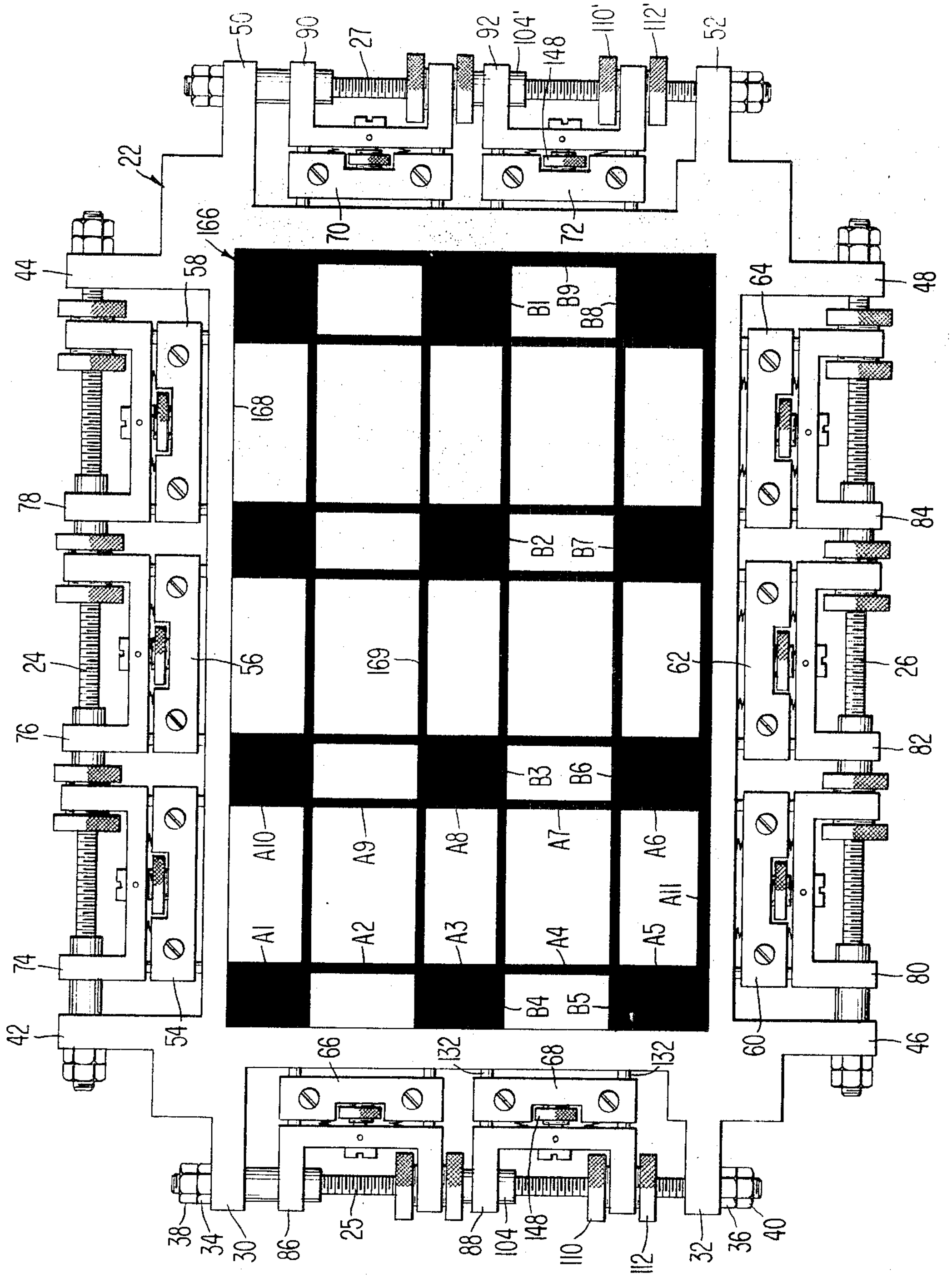
FIG. 1 is a plan view of an aligning fixture constructed in accordance with the invention.

As shown in FIG. 1, the aligning fixture of the invention comprises an open frame 22 in which are secured screw shafts 24, 25, 26, and 27. Screw shaft 25, for example, is journaled in lugs 30 and 32 of the frame 22 and secured axially therein by means of nuts 34 and 36 and locknuts 38 and 40. The screw shafts 24, 26, and 27 are similarly journaled and secured in lugs 42, 44, 46, 48, 50, and 52 of the frame 22.

For each tape in the lattice, there are provided two clamping devices, each for clamping one end of the tape and which is coupled to the adjacent one of the screw shafts 24–27 through a supporting yoke. Thus, with the illustrative lattice of 5 tapes 10–14, the fixture is provided with 10 clamping devices and these are identified individually by reference characters 54, 56, 58, 60, 62, 64, 66, 68, 70, and 72. The supporting yokes are identified individually by reference characters 74, 76, 78, 80, 82, 84, 86, 88, 90, and 92.

The supporting yokes are similar and the clamping devices are similar, and all of these components are similarly coupled to the respective shafts 24–27. Therefore, a description will be given of only one of the supporting yokes and its associated clamping device.

Figure 5:
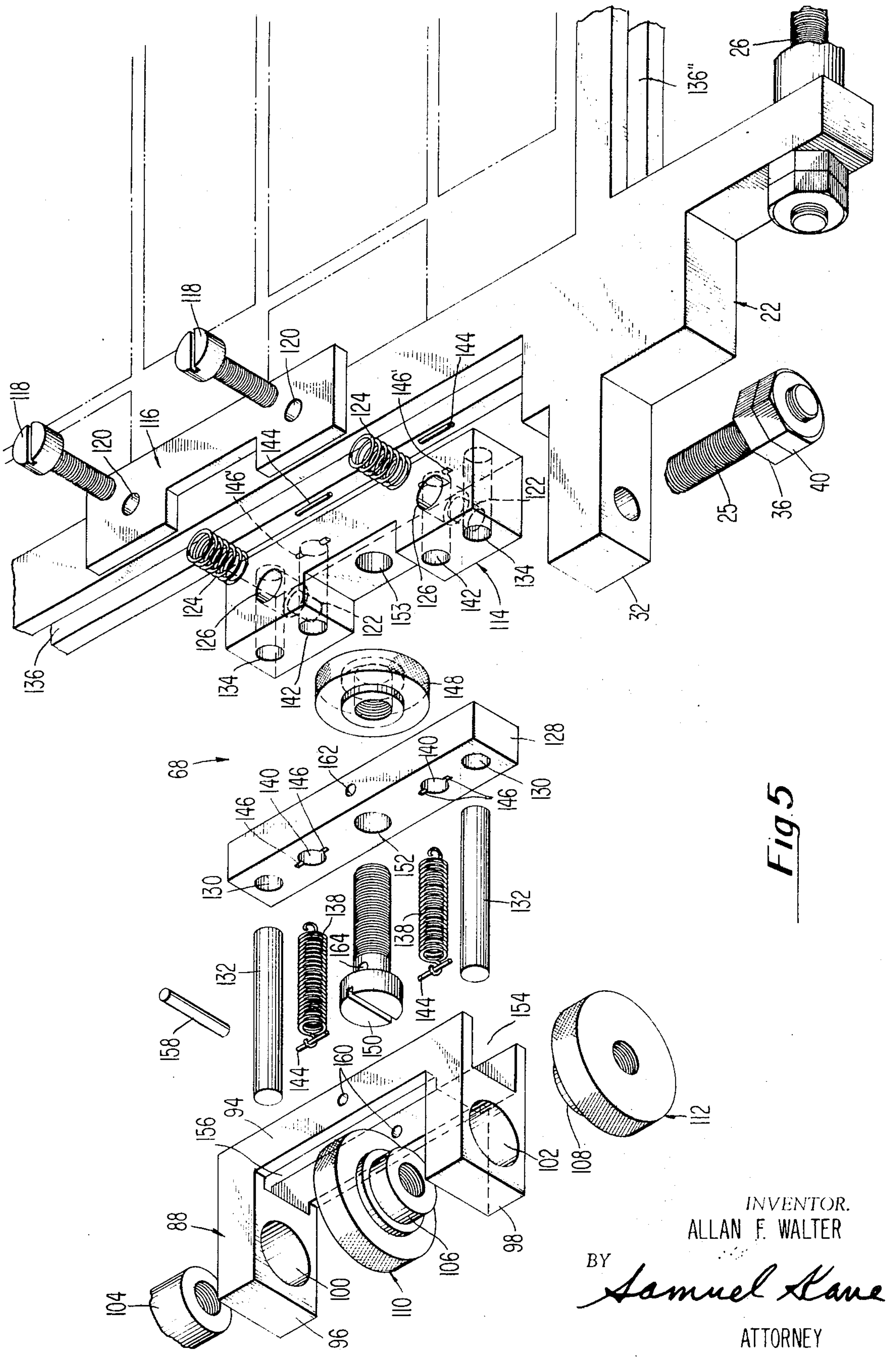
FIG. 5 is an exploded isometric view of the apparatus for clamping and adjusting one end of a tape.

The supporting yoke 88 (FIG. 5), for example, includes a yoke portion 94 from which extend two legs 96 and 98 provided with coaxial openings 100 and 102. Slidably positioned in the opening 100 is a bearing nut 104 which is threaded on the shaft 25, and similarly slidably positioned in the opening 102 are reduced-diameter portions 106 and 108 of adjusting nuts 110 and 112 respectively, each nut 110 and 112 threaded on the shaft 25 and flanking the leg 98 of the supporting yoke 88.

The clamping device 68 which is coupled to the supporting yoke 88 comprises two clamp members between which one end of the flexible tape 11 is to be clamped: a lower guiding clamp member 114 and an upper clamp member 116. The end of the flexible tape 11 is held between the clamp members 114 and 116 by means of screws 118 which pass through clearance holes 120 in the clamp member 116 and are threaded into tapped holes 122 in the guiding clamp member 114. Helical springs 124 positioned in counterbores 126 urge the clamp members 116 and 114 apart whenever the screws 118 are loosened.

The clamping device 68 also includes a pivoting yoke 128 provided with openings 130 in which are pressed-fitted, or otherwise secured, guiding pins 132. As viewed in FIG. 5, the rightward end of the guiding pins 132 extend freely through holes 134 in the guiding clamp member 114 and into a channel-shaped guideway 136 in the frame 22 in which they have a sliding fit. Tension springs 138 pass freely both through openings 140 in the pivoting yoke 128 and through openings 142 in the guiding clamp member 114 and have their looped ends anchored to pins 144 which are nested in notches 146 and 146' in the pivoting yoke 128 and the guiding clamp member 114.

The clamping device 68 further comprises a longitudinal adjusting nut 148 threaded on the end of a headed screw 150 whose shank portion passes through an opening 152 in the pivoting yoke 128 and freely into an opening 153 in the guiding clamp member 114. The pivoting yoke 128 fits freely into an elongate slot 154 in the supporting yoke 88, and the head of the screw 150 extends through a medial opening 156 in the base of the slot 154 and into the space between the legs 96 and 98 of the supporting yoke 88. A pivot 158 is pressed-fitted or otherwise secured in openings 160 in the supporting yoke 88 and passes freely through an opening 162 in the pivoting yoke 128 and an opening 164 in the headed screw 150.

In accordance with the foregoing description, it will now be perceived that whenever the pivoting yoke 128 is given a rocking movement about the pivot 158, the guiding clamp member 114 and clamp member 116 and the end of the tape 11 therebetween will follow the motion of the pivoting yoke 128 by reason of the guiding pins 132 and screw 150 extending into the openings 134 and 153, respectively, of the guiding clamp member 114.

An aligning plate 166 (FIG. 1) constructed of a transparent material such as glass, for example, has a close sliding fit in the central opening 168 of the frame 22. As shown in FIG. 1, a portion of one broad surface of the aligning plate 166 is made opaque, as for example, by painting a particular pattern 169 of black areas and lines so as to produce a number of aligning surfaces to which the end conductors and conductor ends of the flexible tapes 10–14 are to be aligned.

The aligning surfaces for the flexible tapes 12, 13, and 14 are similar to each other. Thus, the aligning surfaces for flexible tape 13 for transverse alignment are A1–A10 and the aligning surface for longitudinal alignment of the flexible tape 13 is an aligning surface A11. The aligning surfaces for flexible tapes 10 and 11 are also similar to each other. Thus, the aligning surfaces for transverse alignment of the flexible tape 11 are aligning surfaces B1–B8 and the aligning surface for longitudinal adjustment of the flexible tape 11 is an aligning surface B9.

Accordingly, whenever the flexible tape 13 is aligned transversely, its end conductor 13*a* (FIG. 2) is brought into alignment with the aligning surfaces A1–A5 (FIG. 1) on the aligning plate 166 and its end conductor 13*b* is brought into alignment with the aligning surfaces A6–A10. When the flexible tape 13 is aligned longitudinally the ends 18*e* and 20*e* (FIG. 2) of its comductors 18 and 20 are brought into alignment with the aligning surface A11 (FIG. 1).

Figure 3:
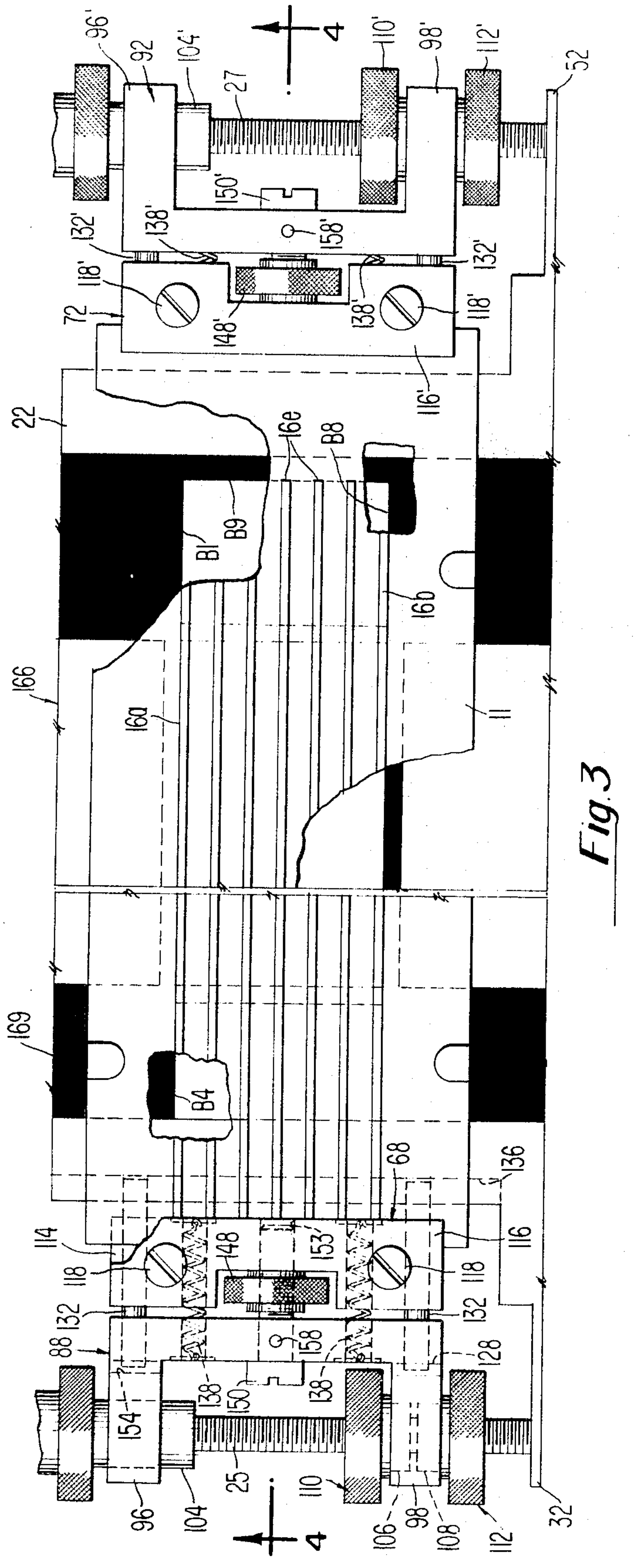
FIG. 3 is an enlarged view of a fragment of the apparatus of FIG. 2 and with portions broken away to more clearly reveal other parts.

The flexible tape 11 is aligned in a similar fashion. Thus the flexible tape 11 is aligned transversely by bringing its end conductor 16*a* into alignment with aligning surfaces B1–B4 (FIGS. 1 and 3) and its end conductor 16*b* into alignment with aligning surfaces B5–B8. Longitudinal alignment of the flexible tape 11 is accomplished by bringing the ends 16*e* of the conductors 16 into alignment with the aligning surface B9.

The flexible tapes 10–14 are similarly mounted and adjusted for alignment on the fixture. Therefore, only a description of the mounting and adjustment of the flexible tape 11 will be given.

The fixture may first be placed on two elongate parallel bars 170 and 172 (FIG. 4) which may have been placed on a transparent or translucent table top positioned over a light source, such as a Light table, not shown. The additional light from the light source projecting upwardly through the transparent portions of the aligning plate 166 facilitates the act of viewing the aligning surfaces and the conductor edges.

Figure 4:
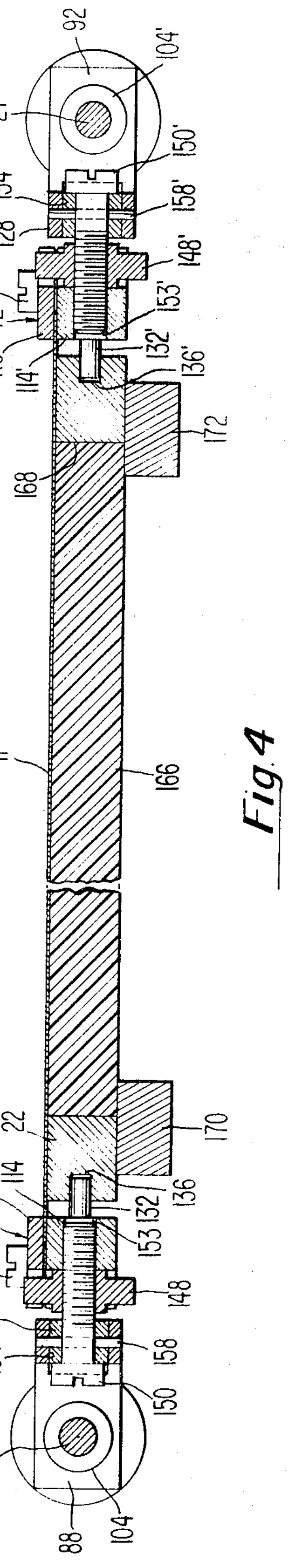
FIG. 4 is a sectional view taken along line 4—4 of FIG. 3.

The aligning plate 166 is lowered into the opening 168 of the frame 22 until it rests on the upper surfaces of the bars 170 and 172. The longitudinal adjusting nuts 148 and 148' of the clamping devices 68 and 72 are then turned toward each other on their respective screws 150 and 150' (FIG. 3) until they force the respective clamp members 114 and 116 and 114' and 116' of the clamping devices 68 and 72 toward each other so as to place the springs 138 and 138' of the two clamping devices 68 and 72 under tension. The flexible tape 11 is then placed on top of the fixture as shown in FIG. 4 and its end regions clamped between the clamping members 114 and 116 and 114' and 116' of the clamping devices 68 and 72. The longitudinal adjusting nuts 148 and 148' may then be backed off sufficiently to place the flexible tape 11 under tension.

Transverse adjustment of the flexible tape 11 is accomplished by manipulating the adjusting screws 110 and 112 and 110' and 112' (FIG. 3) on the screw shafts 25 and 27 so as to move the respective supporting yokes 88 and 92 along the shafts 25 and 27. These adjustments are continued until the conductor 16*a* is in line with the aligning surfaces B1–B4 and the conductor 16*b* is in line with the aligning surfaces B5–B8. The adjusting nuts 110 and 112 and 110' and 112' are then tightened against the respective legs 98 and 98' of the supporting yokes 88 and 92 to lock the supporting yokes 88 and 92 against further movement along the shafts 25 and 27.

Longitudinal adjustment of the flexible tape 11 is made by turning the longitudinal adjusting nuts 148 and 148' of the clamping devices 68 and 72 until the conductor end portions 16*e* are in line with aligning surface B9, and with the flexible tape 11 still under tension.

After all the flexible tapes 10–14 have been similarly aligned, the fixture containing the tape lattice is then lifted off the aligning plate 166 and the parallel bars 170 and 172, and then prepared for subsequent operations such as bonding the flexible tapes at the intersections and applying substrates containing magnetic thin films to the intersections.

I claim:

1. Apparatus for aligning an elongate flexible tape containing flat flexible electrical conductors comprising a framework having opposite spaced mounting portions, first and second clamping means each supported on one of said mounting portions for securing an end portion of said tape, at least one of said clamping means being pivotally supported on a pivot, a first aligning surface, and first adjusting means for adjusting the opposite clamping means which is opposite to a pivoted clamping means so as to move said tape and said opposite clamping means in an arc about said pivot so as to bring said conductors into closer alignment with said first aligning surface.

2. Apparatus according to claim 1 wherein at least one of said clamping means includes tensioning means maintaining said tape in a taut condition.

3. Apparatus according to claim 2 including a second aligning surface, and wherein at least one of said clamping means includes means for moving said tape longitudinally under tension so as to bring said conductors into closer alignment with said second aligning surface.

4. Apparatus according to claim 3 wherein each of said clamping means is pivotally supported on a separate said pivot, there is further provided a second adjusting means for adjusting said at least one of said clamping means so as to move said tape and said at least one of said clamping means in an arc about the pivot supporting said opposite camping means so as to bring said conductors into closer alignment with said first aligning surface, and said first and second adjusting means are adjustable for moving said tape in a direction normal to its longitudinal axis so as to bring said conductors into closer alignment with said first aligning surface.

5. Apparatus for aligning an elongate flexible tape containing flat flexible electrical conductors comprising a frame having opposite spaced side members, first and second shafts each secured to said frame adjacent to one of said side members, first and second supporting yokes each slidably mounted on one of said shafts, first and second clamping means each coupled to one of said supporting yokes for securing an end portion of said tape, a first aligning surface, and means for moving each of said supporting yokes back and forth on the associated shaft so as to move said tape and bring said conductors into closer alignment with said first aligning surface.

6. Apparatus according to claim 5 wherein each of said clamping means is pivotally mounted on the associated supporting yoke.

7. Apparatus according to claim 6 wherein each of said side members has a guideway, and each of said clamping means comprises first and second clamp members between which an end portion of said tape is clamped, and spaced guide pins slidably passed through openings in a guiding one of said clamp members and slidably positioned in said guideway.

8. Apparatus according to claim 7 wherein each of said clamping means further comprises a pivoting yoke pivotally mounted on the associated one of said supporting yokes and secured to said guide pins.

9. Apparatus according to claim 8 wherein each of said clamping means further comprises resilient means for coupling the associated guiding clamp member to the associated pivoting yoke.

10. Apparatus according to claim 9 including a second aligning surface, and wherein each of said clamping means further comprises means for moving the associated clamp members toward and away from the associated supporting yoke in a direction substantially parallel to the longitudinal axis of said tape so as to bring said conductors into closer alignment with said second aligning surface.

* * * * *